US008759679B2

(12) United States Patent
Yoshida et al.

(10) Patent No.: US 8,759,679 B2
(45) Date of Patent: Jun. 24, 2014

(54) WIRE TO CONDUCTIVE METAL PLATE LASER WELDING STRUCTURE

(75) Inventors: Takushi Yoshida, Tokyo (JP); Tomoki Inudo, Tokyo (JP); Hiroshi Akimoto, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 283 days.

(21) Appl. No.: 13/238,634

(22) Filed: Sep. 21, 2011

(65) Prior Publication Data

US 2012/0237787 A1 Sep. 20, 2012

(30) Foreign Application Priority Data

Mar. 15, 2011 (JP) ................................ 2011-056454

(51) Int. Cl.
*B23K 11/00* (2006.01)
*B23K 26/00* (2014.01)

(52) U.S. Cl.
USPC ..................... 174/94 R; 174/84 R; 219/121.6

(58) Field of Classification Search
USPC ...... 174/94 R, 68.1, 84 R; 428/615; 439/874, 439/877; 219/121.63, 121.64, 121.85; 29/860, 863; 228/136
See application file for complete search history.

(56) References Cited

U.S. PATENT DOCUMENTS 4,692,121 A * 9/1987 Arbogast, Jr. ................. 439/874
6,903,922 B2 * 6/2005 Sano et al. .................... 361/533
7,628,647 B2 * 12/2009 Semba et al. ................. 439/579
7,770,290 B2 * 8/2010 Nakamae ........................ 29/857
8,163,997 B2 * 4/2012 Harazono et al. ........... 174/94 R
2004/0142607 A1 7/2004 Asakura et al.
2006/0057903 A1 3/2006 Asakura et al.
2009/0323254 A1 * 12/2009 Yamane et al. ............... 361/520

FOREIGN PATENT DOCUMENTS

| | | | |
|---|---|---|---|
| CN | 2005118805 | A | 5/2005 |
| CN | 101242048 | A | 8/2008 |
| JP | 04089190 | A | 3/1992 |
| JP | 08-008028 | | 12/1996 |
| JP | 2004/192948 | A | 7/2004 |

OTHER PUBLICATIONS

Japanese Office Communication dated Jan. 22, 2013 from corresponding Japanese Patent Application No. JP2011-056454 with English translation of relevant part.
Japanese Office Communication dated Jul. 30, 2013 from corresponding Japanese Patent Application No. JP2011-056454 with English translation of relevant part.

(Continued)

*Primary Examiner* — Angel R Estrada
*Assistant Examiner* — Dimary Lopez Cruz
(74) *Attorney, Agent, or Firm* — Maier & Maier, PLLC

(57) ABSTRACT

A laser welding structure that is formed by joining a stranded wire (wire) of a signal line and a welding portion (conductive metal plate) by locally applying a laser beam and thereby melting and solidifying the stranded wire of the signal line and the welding portion has the following features. That is, the melting point of the stranded wire of the signal line and the melting point of the welding portion are different. The laser welding structure is obtained by applying a laser beam to one of the stranded wire of the signal line and the welding portion that has a higher melting point, i.e., to the welding portion having a higher melting point.

6 Claims, 7 Drawing Sheets

(56) References Cited

OTHER PUBLICATIONS

Office Action Issued on Jan. 23, 2014 by the State Intellectua; Property Office of the People's Republic of China (Issuance No. 2013123001224000) for Chinese Patent Application No. 201110359434.7.

Office Action mailed Jan. 3, 2014 by the State Intellectual Property Office of PRC in CN 201110359434.7.

* cited by examiner

RELATED ART

WIRE TO CONDUCTIVE METAL PLATE LASER WELDING STRUCTURE

RELATED APPLICATIONS

This application claims priority under 35 U.S.C. §119 to Japanese Patent Application No. 2011-056454, filed on Mar. 15, 2011, the disclosure of which is incorporated by reference herein in its entirety.

BACKGROUND OF THE INVENTION

1. Field of the Invention

The present invention relates to a laser welding structure in which a wire and a conductive metal plate are joined together by locally applying a laser beam and thereby melting and solidifying the wire and the conductive metal plate.

2. Description of Related Art

As shown in FIG. 7 of the present application, Japanese Patent Application Publication No. 8-8028 (hereinafter referred to as "Patent literature 1") discloses a technique to laser-weld a wire 103 to a conductive metal plate 101, which is integrally formed with a terminal 100, by applying a welding-mode laser beam 102 to the conductive metal plate 101.

However, in the technique disclosed in Patent literature 1, though depending on the material, the size, or the combination thereof of the objects to be welded, it is necessary to adjust the total thermal energy to a larger value than necessary to allow for a margin so that the wire 103 as well as the conductive metal plate 101 are melted without fail.

An object of the present invention is to provide a technique to reduce the total thermal energy necessary to melt both the conductive metal plate and the wire.

SUMMARY OF THE INVENTION

In accordance with the present invention, a laser welding structure that is formed by joining a wire and a conductive metal plate by locally applying a laser beam and thereby melting and solidifying the wire and the conductive metal plate has the following features. That is, the melting point of the wire and the melting point of the conductive metal plate are different from each other. The laser welding structure is obtained by applying the laser beam to one of the wire and the conductive metal plate that has a higher melting point.

Preferably, the melting point of the conductive metal plate is higher than that of the wire.

Preferably, before the melting, the conductive metal plate has a wide shape so that the wire is concealed behind the conductive metal plate as viewed in the irradiation direction of the laser beam.

Preferably, before the melting, the cross-sectional area of the conductive metal plate is larger than that of the wire.

Preferably, the wire is a solid wire.

Preferably, the wire is the center conductor of a coaxial cable.

Preferably, the wire is a stranded wire. Further, a wire harness having the above-described laser welding structure is also provided.

According to the present invention, when the melting point of the conductive metal plate is higher than that of the wire, the laser beam is applied to the conductive metal plate and the conductive metal plate melts earlier than the wire. Then, since the melting point of the conductive metal plate is higher than that of the wire, the wire can be also melted without fail by the heat received from the conductive metal plate, provided that the conductive metal plate is melted. Therefore, since the amount of heat transfer necessary for the welding can be reduced, it is possible to reduce the amount of the laser irradiation. Further, as a result, the occurrence of sputter can be also suppressed, thus contributing to the productivity improvement. Note that similar advantageous effects can be also achieved when the melting point of the wire is higher than that of the conductive metal plate.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

A first exemplary embodiment according to the present invention is explained hereinafter with reference to FIGS. 1 to 6.

Figure 1:
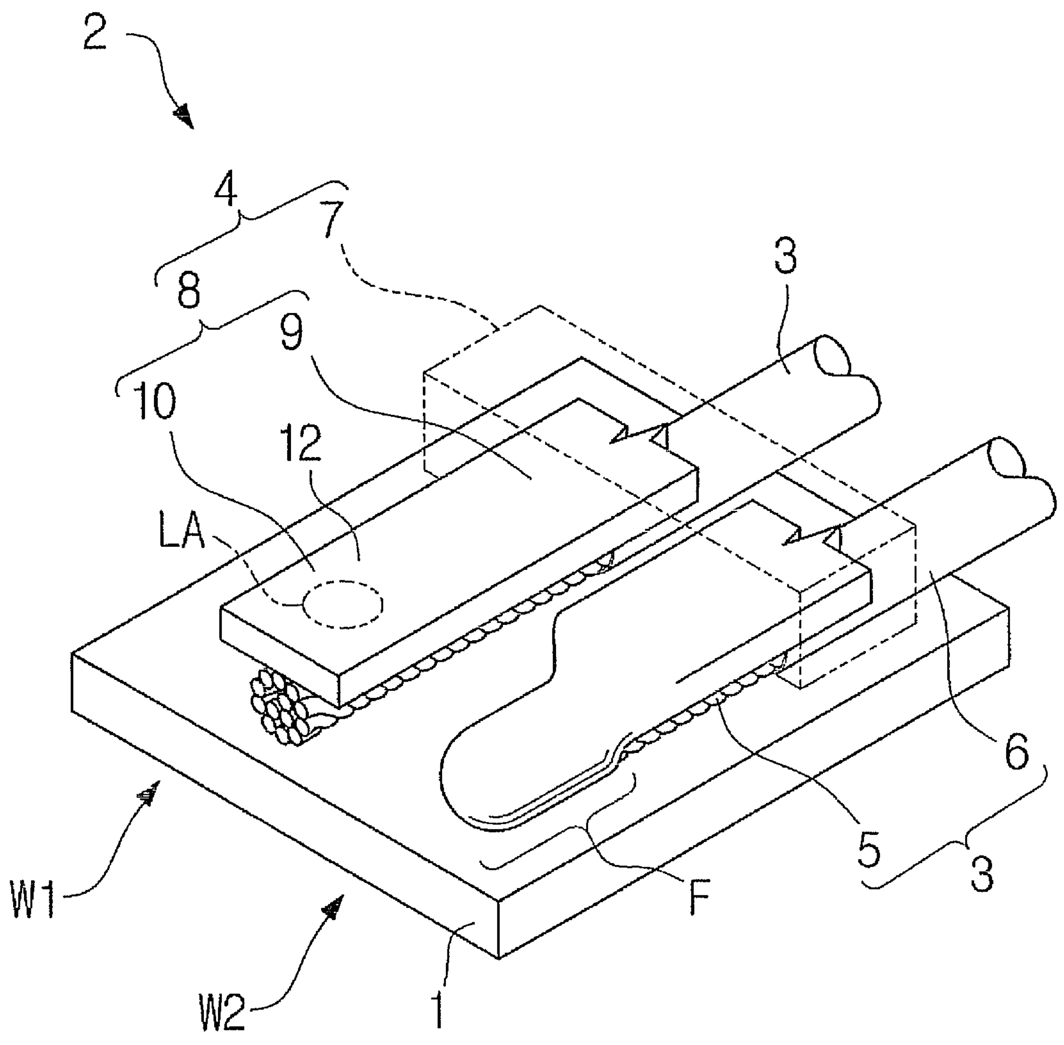
FIG. 1 is a partial perspective view of a wire harness (first exemplary embodiment)

FIG. 1 shows a wire harness 2 placed on a workbench 1. The following explanation is made on the assumption that this wire harness 2 is a wire harness for use in mobile phones, which have been significantly reduced in size in these days. Note that in FIG. 1, a symbol "W1" indicates an aspect before the laser welding and a symbol "W2" indicates an aspect after the laser welding.

The wire harness 2 is composed of a plurality of bundled signal lines 3 and a plug-side connector 4.

Each signal line 3 is composed of stranded wire 5 (wire) made of copper or a copper alloy, and a covering material 6 made of, for example, polyethylene or vinyl chloride. The covering material 6 covers the stranded wire 5. In this exemplary embodiment, the outer diameter of the signal line 3 is about 400 micrometers, and the outer diameter of the stranded wire 5 is about 250 micrometers.

The plug-side connector 4 is a connector that is coupled with an opposite-side connecter, i.e., a receptacle-side connector (not shown), mounted on the surface of a substrate of a mobile phone. The plug-side connector 4 is composed of a housing 7 made of insulating material such as plastic, and a plurality of contacts 8.

The housing 7 is used to support the plurality of contacts 8.

Each contact 8 is brought into contact with a contact provided in the receptacle-side connector to connect the stranded wire 5 of a respective one of the signal lines 3 to the substrate of the mobile phone. Each contact 8 extends along the stranded wire 5 of a respective one of the signal lines 3. Each contact 8 includes a portion to be supported 9 and a welding portion 10 (conductive metal plate). In each contact 8, the portion to be supported 9 and the welding portion 10 are integrally formed. In this exemplary embodiment, each contact 8 is formed of iron or an iron alloy.

The portion to be supported 9 is supported by the housing 7, and serves as a portion having a contact corresponding to a contact of the receptacle-side connector.

Figure 2:
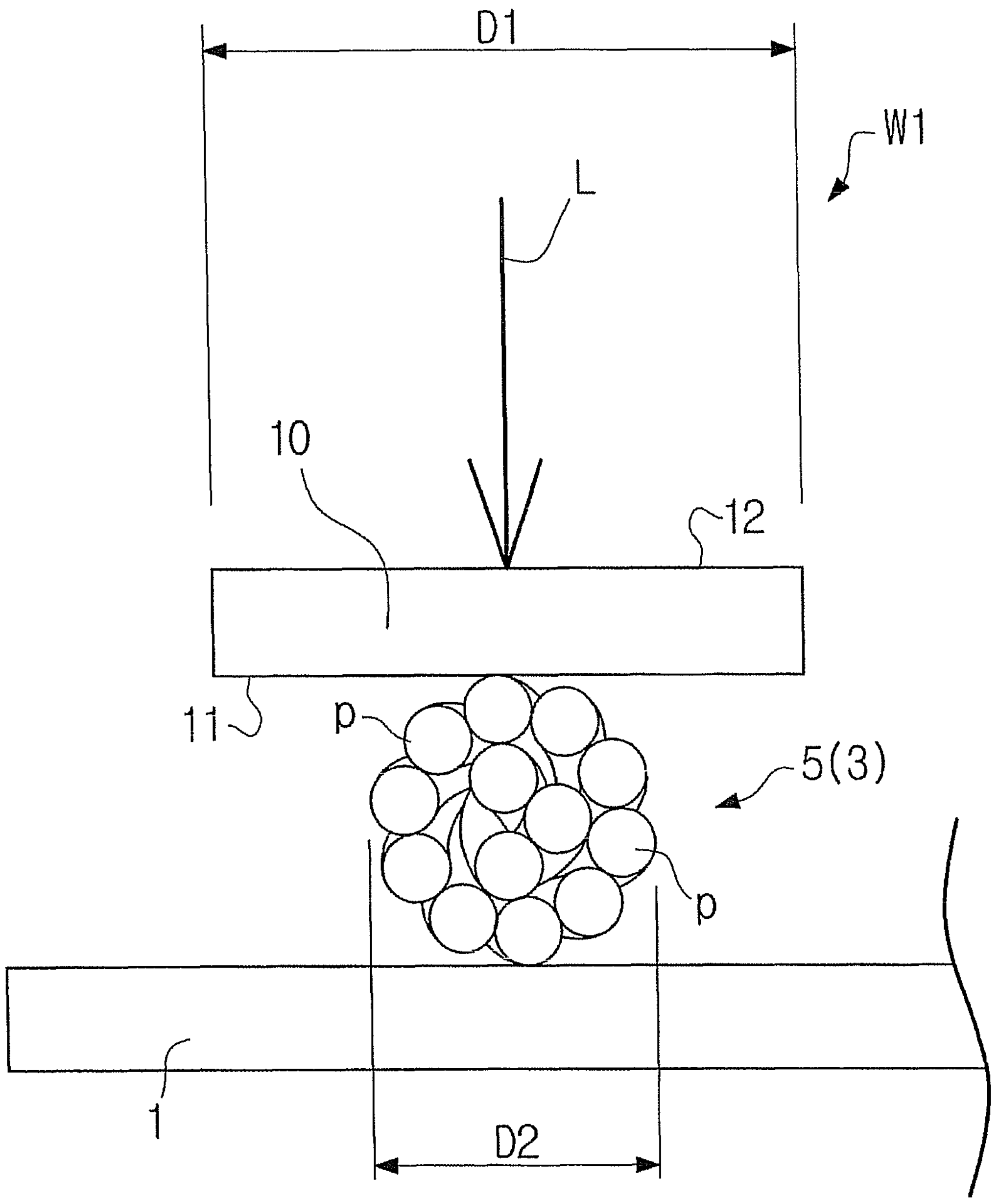
FIG. 2 is a front view of a laser welding structure, and a first explanatory figure of a laser welding task (first exemplary embodiment)

The welding portion 10 serves as a portion that is laser-welded to the stranded wire 5 of the respective signal line 3. As shown in FIG. 2, the welding portion 10 includes a stranded-wire facing surface 11 that faces the stranded wire 5 of the signal line 3 and a laser irradiation surface 12 opposite to the stranded-wire facing surface 11. Further, in this exemplary embodiment, a laser beam L is applied to the laser irradiation surface 12 of the welding portion 10. Specifically, the laser beam L is applied to a laser-beam irradiation area LA of the laser irradiation surface 12 of the welding portion 10, which is indicated by a chain double-dashed line in FIG. 1.

Further, as shown in FIG. 2, the welding portion 10 has a sufficiently-wide shape so that the stranded wire 5 of the signal line 3 is concealed behind the welding portion 10 as viewed in the irradiation direction of the laser beam L. That is, in FIG. 2, the width D1 of the welding portion 10 and the width D2 of the stranded wire 5 of the signal line 3 satisfy a relation "D1>D2". Further, the cross-sectional area of the welding portion 10 is larger than the cross-sectional area of the stranded wire 5 of the signal line 3. Note that "cross-sectional area of the stranded wire 5 of the signal line 3" is equivalent to the total cross-sectional area of all the copper wires p constituting the stranded wire 5 of the signal line 3.

Figure 3:
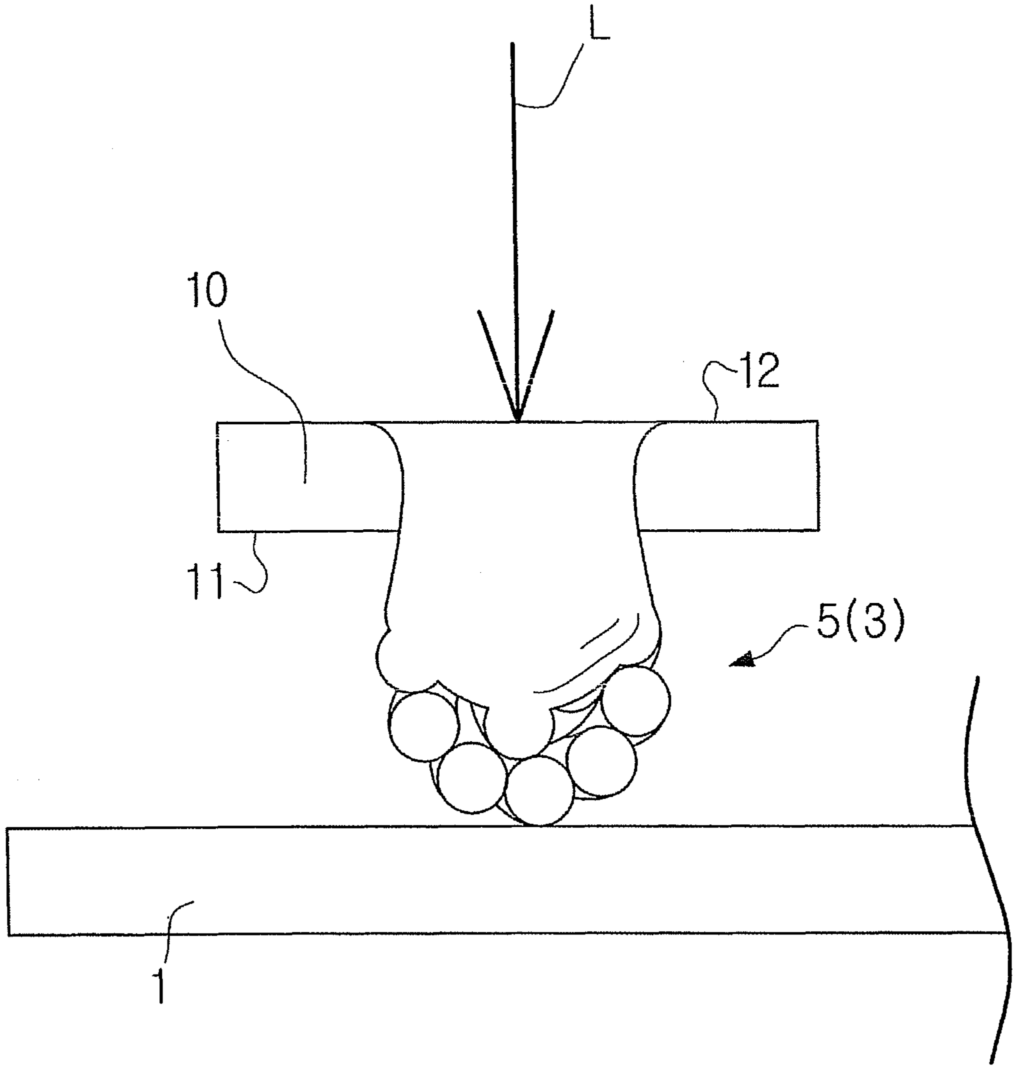
FIG. 3 is a front view of a laser welding structure, and a second explanatory figure of a laser welding task (first exemplary embodiment)
Figure 4:
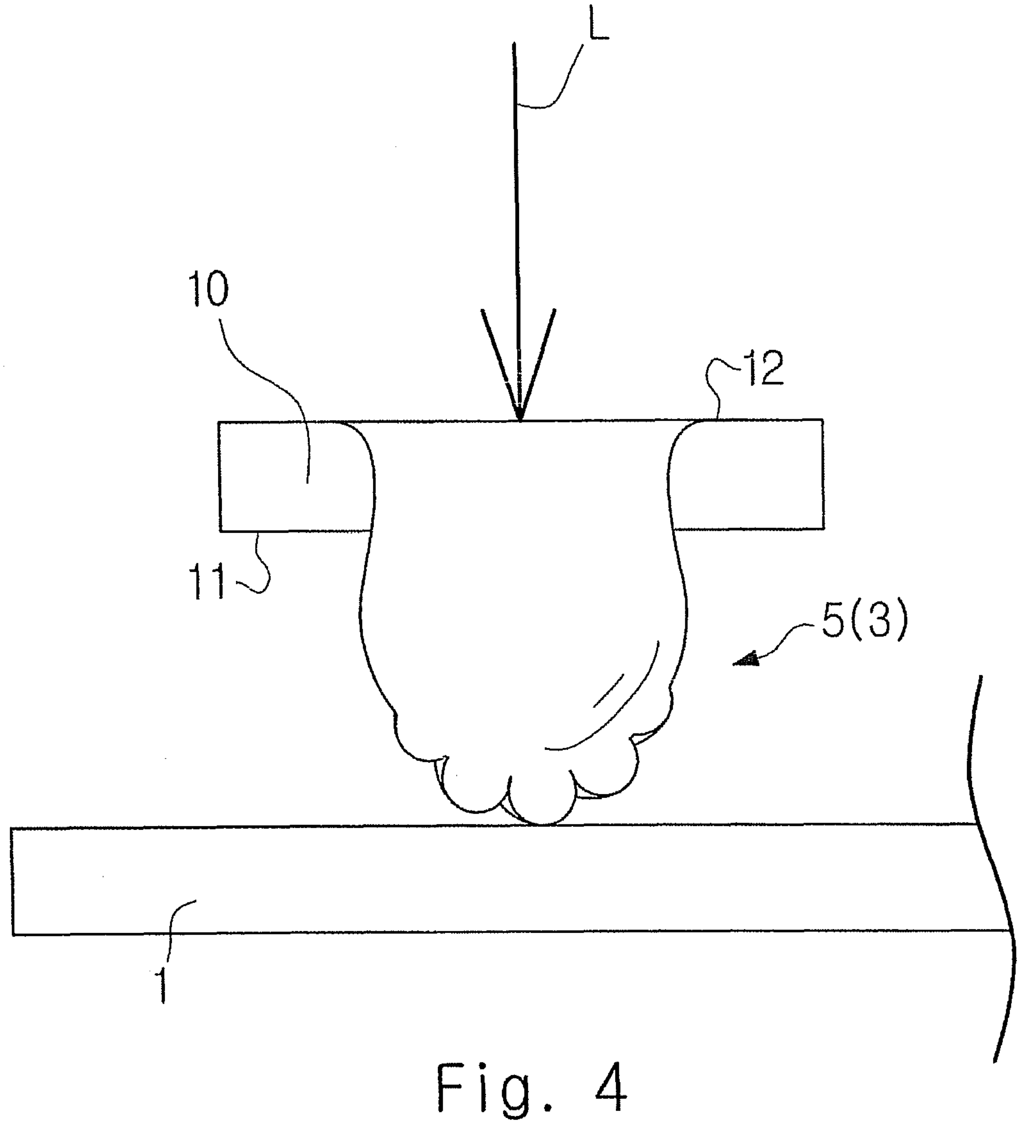
FIG. 4 is a front view of a laser welding structure, and a third explanatory figure of a laser welding task (first exemplary embodiment)
Figure 5:
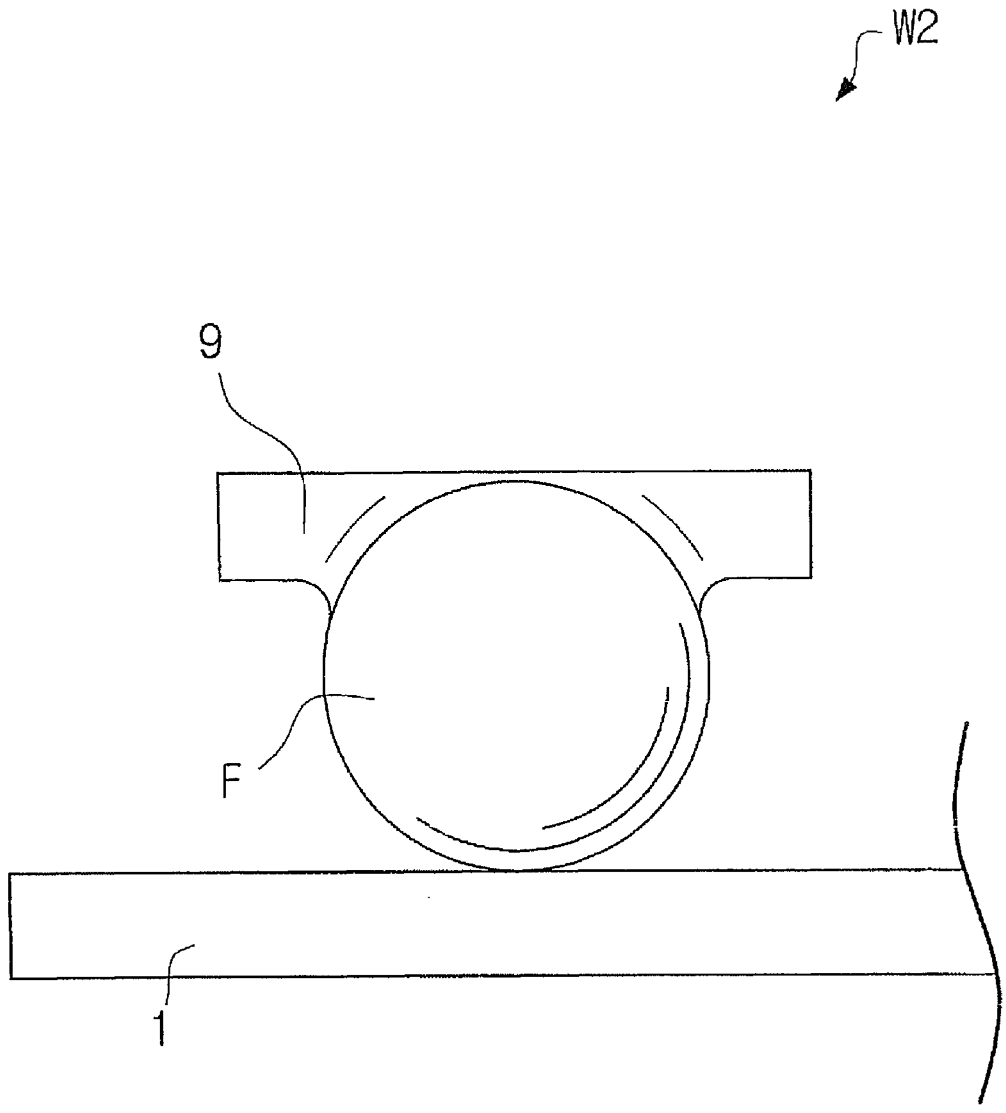
FIG. 5 is a front view of a laser welding structure, and a fifth explanatory figure of a laser welding task (first exemplary embodiment)

After the stranded wire 5 of the signal line 3 is brought into intimate contact with the welding portion 10 with the above-described structure, the laser beam L is locally applied to the laser-beam irradiation area LA of the laser irradiation surface 12 of the welding portion 10 as shown in FIG. 2 (also refer to FIG. 1). As a result, the stranded wire 5 of the signal line 3 and the welding portion 10 are melted as shown in FIGS. 3 and 4, and then solidified as shown in FIG. 5, thereby firmly joining them together. FIG. 5 shows a laser welding structure F that is formed by joining the stranded wire 5 of the signal line 3 and the welding portion 10 by locally applying the laser beam L and thereby melting and solidifying the welding portion 10 and the stranded wire 5 of the signal line 3 as shown in FIGS. 2 to 4. As shown in FIG. 5, the laser welding structure F forms an alloy structure in which the stranded wire 5 of the signal line 3 and the welding portion 10 are fused together. Further, because of the surface tension at the melted state, the laser welding structure F has a somewhat roundish outside appearance. Further, the wire harness 2 shown in FIG. 1 has a plurality of laser welding structures F.

Further, as shown in FIG. 1, the laser welding structure F is formed at the end of the signal line 3 in this exemplary embodiment. In other words, each contact 8 is connected to the end of the stranded wire 5 of a respective one of the signal lines 3 by laser-welding.

For reference, physical properties of copper and iron as a pure metal are shown below.

(Copper)
Melting point: 1083° C.
Specific heat: 0.0096 J/(g·K)
Melting latent heat: 205 J/g
Specific resistance: 1.693Ω·m (Iron)
Melting point: 1536° C.
Specific heat: 0.456 J/(g·K)
Melting latent heat: 268 J/g
Specific resistance: 9.71Ω·m (JSME Mechanical Engineers' Concise Handbook 6$^{th}$ Edition, Apr. 15, 2005, Tenth-printing, pp. 174-175, The Japan Society of Mechanical Engineers)

According to the above-mentioned literature, the melting point of iron is considerably higher than that of copper. Therefore, in this exemplary embodiment, it can be safely said that the melting point of the welding portion 10 is higher than that of the stranded wire 5 of the signal line 3.

A preferable first exemplary embodiment according to the present invention has been explained so far. In short, the above-described first exemplary embodiment has the following characteristics.

The laser welding structure F that is formed by joining the stranded wire 5 (wire) of the signal line 3 and the welding portion 10 (conductive metal plate) by locally applying the laser beam L and thereby melting and solidifying the welding portion 10 and the stranded wire 5 of the signal line 3 has the following features. That is, the melting point of the stranded wire 5 of the signal line 3 and the melting point of the welding portion 10 are different from each other. As shown in FIGS. 2 to 5, the laser welding structure F is obtained by applying the laser beam L to one of the stranded wire 5 of the signal line 3 and the welding portion 10 that has a higher melting point, i.e., to the welding portion 10 having a higher melting point. According to the above-described structure, the laser beam L is applied to the welding portion 10 and the welding portion 10 melts earlier than the stranded wire 5 of the signal line 3. Then, since the melting point of the welding portion 10 is higher than that of the stranded wire 5 of the signal line 3, the stranded wire 5 of the signal line 3 can be also melted without fail by the heat received from the welding portion 10, provided that the welding portion 10 is melted. Therefore, there is no need to allow for a margin for the irradiation time of the laser beam L and the like to sufficiently melt the stranded wire 5 of the signal line 3 as well as the welding portion 10. Accordingly, the total thermal energy necessary to melt both the welding portion 10 and the stranded wire 5 of the signal line 3 can be reduced. Note that when the melting point of the stranded wire 5 of the signal line 3 is higher than that of the welding portion 10, the laser beam L is applied to the stranded wire 5 of the signal line 3. Even in this case, similar advantageous effects can be also achieved.

Further, as shown in FIG. 2, before the melting, the welding portion 10 has a wide shape so that the stranded wire 5 of the signal line 3 is concealed behind the welding portion 10 as viewed in the irradiation direction of the laser beam L. With the above-described configuration, the welding portion 10 is melted in such a manner that the welding portion 10 wraps around the stranded wire 5 of the signal line 3 as shown in FIGS. 3 to 5. As a result, the heat is smoothly transferred from the welding portion 10 to the stranded wire 5 of the signal line 3. Therefore, even when the stranded wire 5 of the signal line 3 is somewhat disentangled, the laser welding structure F can reliably wrap around the stranded wire 5 of the signal line 3. Therefore, the connection quality between the contact 8 and the stranded wire 5 of the signal line 3 is improved, thus resulting in a better yield.

Further, as shown in FIG. 2, the cross-sectional area of the welding portion 10 is larger than that of the stranded wire 5 of the signal line 3 before the melting. With the above-described configuration, it is ensured that the welding portion 10 is melted in a sufficient amount, thus allowing the welding portion 10 to melt and to wrap around the stranded wire 5 of the signal line 3 even further. Therefore, even when the stranded wire 5 of the signal line 3 is somewhat disentangled, the laser welding structure F can wrap around the stranded wire 5 of the signal line 3 more reliably.

Figure 6:
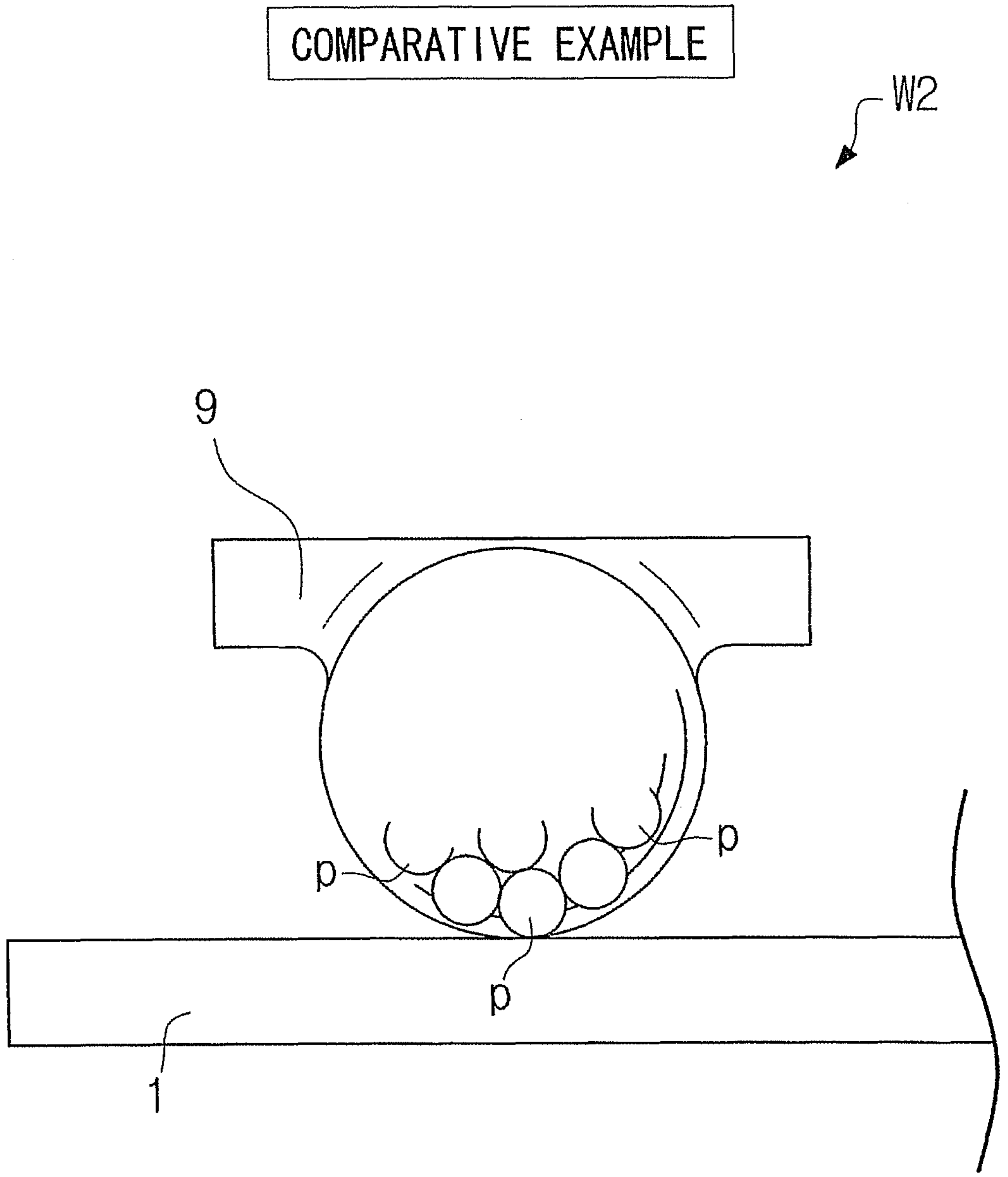
FIG. 6 is a figure corresponding to FIG. 6, and showing a comparative example.
Figure 7:
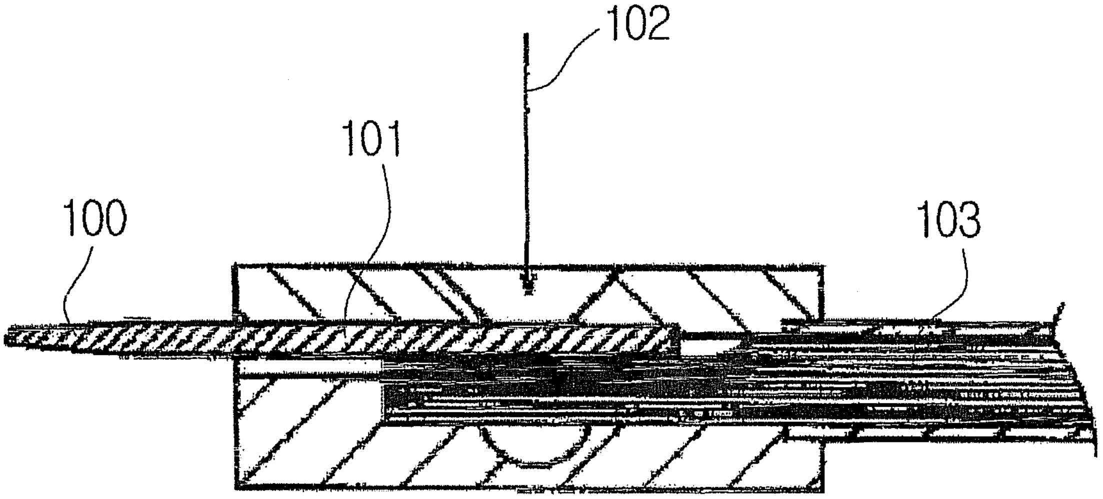
FIG. 7 is a figure corresponding to FIG. 5 of Patent document 1.

To supplement the above-described technical significance, the comparative example shown in FIG. 6 is explained hereinafter. The comparative example shown in FIG. 6 represents a case where although the melting point of the welding portion 10 is lower than that of the stranded wire 5 of the signal line 3, the laser beam L is applied to the welding portion 10, and in addition the total thermal energy supplied to the welding portion 10 by the laser beam L is too low. In this case, it is believed that even if the welding portion 10 melts and the temperature of the welding portion 10 in the melted state exceeds the melting point of the stranded wire 5 of the signal line 3, some of the plurality of copper wires p constituting the stranded wire 5 could not be completely melted.

Here, the related art to which the above-described laser welding structure belongs is further explained in a somewhat more elaborate manner. That is, the raw materials of the stranded wire 5 of the signal line 3 and the welding portion 10 are determined with comprehensive consideration given to the conductivity, the cost, and the like. In this determination, in general, the same raw material is used for both the stranded wire 5 of the signal line 3 and the welding portion 10. This is because, when different types of metals are welded together, there is a possibility that the laser-welded area exhibits unexpected brittleness. To prevent end products from having such brittleness, it is necessary to introduce a new endurance test. However, introducing a new endurance test is troublesome. Especially, when the above-described laser welding structure is applied to mobile terminals such as mobile phones, this problem is worsened because dropping impacts are unavoidable in the mobile terminals. In this sense, it can be safely said that the above-described laser welding structure, which is based on the premise that the stranded wire 5 of the signal line 3 and the welding portion 10 are formed from different types of metals, is based on a technical concept that contradicts to the common technical knowledge at the time when the present application is filed.

The first exemplary embodiment that has been explained above can be modified in the following manner.

That is, in the above-described first exemplary embodiment, the welding portion 10 is laser-welded to the end of the stranded wire 5 of the signal line 3. However, instead of this configuration, the welding portion 10 may be laser-welded to the middle portion of the stranded wire 5 of the signal line 3.

Second Exemplary Embodiment

In the above-described first exemplary embodiment, the signal line 3 is composed of the stranded wire 5 and the covering material 6. However, a solid wire (wire) may be used in place of the stranded wire 5.

Third Exemplary Embodiment

In the above-described first exemplary embodiment, the signal line 3 is composed of the stranded wire 5 and the covering material 6. However, instead of this configuration, the signal line 3 may be a coaxial cable composed of a center conductor, a dielectric disposed around the center conductor, an external conductor disposed around the dielectric, and a protective covering disposed around the external conductor. In this case, the center conductor (wire) of the signal line 3 and the welding portion 10 are laser-welded.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser welding structure formed by joining a wire and a conductive metal plate by locally applying a laser beam and thereby melting and solidifying both the wire and the conductive metal plate, wherein a melting point of the wire and a melting point of the conductive metal plate are different from each other, the laser beam is applied to one of the wire and the conductive metal plate that has a higher melting point, the melting point of the conductive metal plate is higher than the melting point of the wire, before the melting, the conductive metal plate has a wide shape so that the wire is concealed behind the conductive metal plate as viewed in an irradiation direction of the laser beam, and the conductive metal plate has a first surface facing to the wire and a second surface which is a surface opposite to the first surface, and the laser beam is applied to the second surface.

2. The laser welding structure according to claim 1, wherein before the melting, a cross-sectional area of the conductive metal plate is larger than a cross-sectional area of the wire.

3. The laser welding structure according to claim 1, wherein the wire is a solid wire.

4. The laser welding structure according to claim 1, wherein the wire is a center conductor of a coaxial cable.

5. The laser welding structure according to claim 1, wherein the wire is a stranded wire.

6. The laser welding structure according to claim 1, wherein the laser welding structure is incorporated into a wire harness.

* * * * *